United States Patent
Giuseppin et al.

(10) Patent No.: US 8,486,481 B2
(45) Date of Patent: Jul. 16, 2013

(54) GLYCOALKALOID REMOVAL

(75) Inventors: Marco Luigi Federico Giuseppin, Gieten (NL); Marc Christiaan Laus, Groningen (NL)

(73) Assignee: Coöperatie AVEBE U.A., Veendam (NL)

( * ) Notice: Subject to any disclaimer, the term of this patent is extended or adjusted under 35 U.S.C. 154(b) by 578 days.

(21) Appl. No.: 12/514,249

(22) PCT Filed: Oct. 25, 2007

(86) PCT No.: PCT/NL2007/050514
§ 371 (c)(1), (2), (4) Date: Aug. 13, 2009

(87) PCT Pub. No.: WO2008/056977
PCT Pub. Date: May 15, 2008

(65) Prior Publication Data
US 2010/0036090 A1  Feb. 11, 2010

(30) Foreign Application Priority Data

Nov. 10, 2006 (EP) .................................. 06077000
Jul. 17, 2007 (EP) .................................. 07112636

(51) Int. Cl.
*A23J 1/00* (2006.01)
(52) U.S. Cl.
USPC .......................... 426/656; 530/417; 530/370
(58) Field of Classification Search
USPC .................................................. 426/656, 431
See application file for complete search history.

(56) References Cited

U.S. PATENT DOCUMENTS 6,299,867 B1 * 10/2001 Aoyagi et al. ............... 424/76.1

* cited by examiner

*Primary Examiner* — Elizabeth Gwartney
(74) *Attorney, Agent, or Firm* — Hoffman & Baron, LLP

(57) ABSTRACT

The invention relates to a process for the removal of glycoalkaloids, in particular from process streams such as those encountered during isolation of proteins from potatoes.

17 Claims, 5 Drawing Sheets

Figure 1:
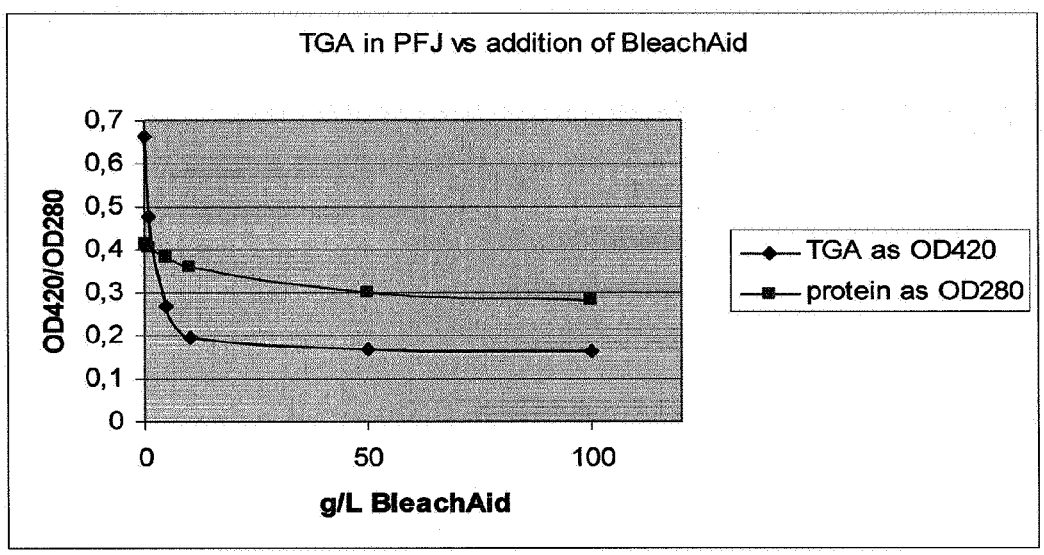

Lane 1; potato fruit juice as is
Lane 2; 0 g/l BleachAid
Lane 3; 1 g/l BleachAid
Lane 4; 5 g/l BleachAid
Lane 5; 10 g/l BleachAid
Lane 6; 50 g/l BleachAid
Lane 7; 100 g/l BleachAid
Lanes 8 - 14 10× diluted samples 1 - 7

GLYCOALKALOID REMOVAL

This application is the U.S. National Phase of, and Applicants claim priority from, International Application Number PCT/NL2007/050514 filed 25 Oct. 2007, European Patent Application No. 06077000.5 filed 10 Nov. 2006 and European Patent Application No. 07112636.1 filed 17 Jul. 2007, all of which are incorporated herein by reference.

BACKGROUND OF THE INVENTION

The invention relates to a process for the removal of glycoalkaloids, in particular from process streams such as those encountered during isolation of proteins from potatoes.

The potato belongs to the Solanaceae, or nightshade, family whose other members include tomatoes, eggplants, peppers and tomatillos. The proteins that can be found in potatoes have great nutritional value. The nutritional qualities, i.e. protein efficiency ratio and biological value, of these proteins have been shown to be greater than those of casein and comparable to those of whole egg. Potato protein is rich in lysine and theoretically an excellent supplement for lysine-poor proteins such as those of cereals.

Native potato proteins can tentatively be divided into three classes (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots et al., *J. Sci. Food. Agric.* 1999, 79, 1557-1564). Patatin is a family of glycoproteins that have lipid acyl hydrolase and transferase activities and can account for up to 40% of the total soluble protein fraction in potato tubers.

Potato proteins may be isolated from potato fruit juice. In the professional vocabulary, the undiluted juice from the potato tuber is called potato fruit juice (PFJ), whereas the diluted juice is designated potato fruit water. Both have a high content of organic materials which give rise to high oxygen demand in waste water from the potato starch plants. The potato fruit water also contains phosphorous- and nitrogen-compounds which fertilize the recipients. Some potato starch manufacturers employ evaporation or reverse osmosis to concentrate potato fruit water for use as feed supplement. Reverse osmosis, which is not as energy demanding as evaporation, does however demand that the potato fruit water is pre-treated and filtered to clarity to avoid clogging of the membranes which hold inorganic salts and low molecular weight organic components back in the concentrate.

Fresh potato juice is a complex mixture of soluble and insoluble material comprising proteins, starch, minerals, toxic glycoalkaloids, fibers and monomeric and polymeric reactive phenols. Due to oxidation of natural phenolic compounds potato juice may turn brown or black. Chemically, the phenolic compounds are oxidized into quinones, which rapidly combine into a dark polymer residue. During the oxidation process, the proteins may undergo rapid reaction and partial crosslinking. This crosslinking dramatically reduces the solubility of the proteins, potentially resulting in sedimentation. Thus, from a technological point of view, the complexity and instability of the potato juice makes the separation and isolation of minimally denatured or modified potato proteins much more complicated and economically demanding than the isolation of proteins from other types of protein solution, such as ewe or cow milk.

Another complication of purification of potato proteins is formed by the presence of glycoalkaloids, which must be removed before the potato proteins may be used in human nutrition and human applications. Glycoalkaloids are well-known anti-nutritional factors. The glycosylated forms of glycoalkaloids, such as α-solanine and α-chaconine, show the highest toxicity. The aglycons, such as solanidine, have a more than 100-fold lower toxicity. α-Solanine and α-chaconine make up more than 95% of the total glycoalkaloid content in potatoes. Other glycoalkaloids are for example tomatine, tomatidenol and demissidine. In the context of the present disclosure, the level of glycoalkaloids is expressed as the sum of all glycoalkaloids. In case of potatoes this predominantly consists of α-solanine and α-chaconine.

Glycoalkaloids have a bitter taste and negatively affect many of the physical and/or biological properties of potato proteins, especially when the pH is increased by adhering to the soluble proteins as shown in the present disclosure. For food applications, the taste threshold of glycoalkaloids is about 140-170 mg of glycoalkaloids expressed as α-solanine per kg of product. This threshold strongly limits the applications of known native potato protein isolates in foods.

Various attempts have been made to remove glycoalkaloids. WO-97/42834, for instance, discloses a partial removal of glycoalkaloids by various ultrafiltration methods at excessive diafiltration conditions. Ultrafiltration can remove some glycoalkaloids and salts, but does not remove contaminants of high molecular weight, such as pectines, polyphenols and proanthocyanidines and colored derivatives thereof, such as epicatechins and anthocyanines, that are formed at pH values below 4.5.

Houben et al., *J. Chromatogr. A*, 1994, 661, 169-174 have employed a HPLC method which, however, does not detect the aglycons that are formed by enzymatic hydrolysis after prolonged processing of potato juice.

In DE 100 60 512 it has been proposed to remove glycoalkaloids from potato proteins by acidic extraction. This method, however, is not suitable for achieving glycoalkaloid levels below 100 ppm. Furthermore, this method can only be employed for precipitated or coagulated protein, and not for native, soluble protein.

Another method for removal of glycoalkaloids that has been suggested is enzymatic hydrolysis. This method, however, does not lead to removal of aglycon, which also binds to the potato proteins with negative effects on their physical and biological properties.

Fermentation is deemed unsuitable for safe removal of glycoalkaloids in the production of native potato proteins. Conversion by fermentation causes severe technical problems when implemented at commercial scale. The bioconversions are costly and have a low productivity. The microorganisms that are used and their metabolites may end up in the protein product, which is undesirable.

One of the major problems in the isolation of potato proteins is caused by the common method of recovering the potato protein from the effluent of potato starch mills, which involves heat coagulation. Attempts to isolate the proteins from the potato juice using milder methods, such as membrane filtration and precipitation by heat or acid treatment, have proven to be inefficient on industrial scale. Membrane filtration applied directly to unclarified and clarified potato juice has proven to be very complicated and inefficient due to heavy fouling of the membranes and concomitant loss of flux and separation ability. Both membrane filtration and precipitation methods have significant drawbacks when applied directly to the potato juice due to the lack of selectivity between the desired protein product and other components in the raw material. Membrane filtration, for example, cannot separate the high molecular weight protein product from polymerized phenolic compounds or polysaccharides since the membrane will tend to retain them all. These compounds form complexes with potato proteins and result in a poorly soluble protein and low functionality in applications.

In the European patent application no. 06077000.5, an improved method for isolating native proteins from potatoes has been disclosed. This method comprises subjecting potato fruit juice to a flocculation by a divalent metal cation at a pH of 7-9, centrifuging the flocculated potato fruit juice, thereby forming a supernatant, subjecting the supernatant to expanded bed adsorption chromatography operated at a pH of less than 11 and a temperature of 5-35° C. using an adsorbent capable of binding potato protein, thereby adsorbing the native potato protein to the adsorbent, and eluting at least one native potato protein isolate from the adsorbent with an eluent. This method constitutes a significant improvement over earlier attempts to isolate potato proteins in that the potato proteins are obtained in native, i.e. non-denatured, form and in that a very high purity may be reached.

Nevertheless, it has been found that the method may not always reach sufficient removal of glycoalkaloids, particularly when variations in raw materials are encountered. Depending on the potato variety, the level of glycoalkaloids in the fruit juice may vary considerably. Variations of a factor 4-10, or more, are common in starch potato processing. For instance, the cultivars Seresta and Kuras contain more than 110-200 ppm some cultivars up to 300 ppm glycoalkaloids in fresh weight potato, whereas an Aveka cultivar contains only 30 ppm in fresh weight potato. The glycoalkaloids tend to adhere to or co-fractionate with the proteins. Potatoes that contain 1-1.5% soluble protein will lead to protein solutions than contain more than 300 to 4000 ppm glycoalkaloids on protein basis.

Also, glycoalkaloid levels may vary per variety depending on the harvesting season and weather conditions. It has been found that the method disclosed in the European patent application no. 06077000.5 may be difficult to adjust to cope with the variations in glycoalkaloid level, particularly when these variations are higher than 200 ppm. As a result, it may happen that the potato protein isolates obtained contain unsatisfactory amounts of glycoalkaloids.

There is thus still a need for a simple and effective method to remove glycoalkaloids from process streams encountered during isolation of potato proteins in native, soluble form on an industrial scale.

SUMMARY OF THE INVENTION

In accordance with the invention, it has surprisingly been found that glycoalkaloids may be removed from an aqueous solution of a vegetable protein, such as potato protein or yam protein, by adsorption using a layered silicate as adsorbent. Without wishing to be bound by theory, it is postulated that the layered silicate not only adsorbs glycoalkaloids, but can also play a role in breaking up the complexes formed by the proteins and glycoalkaloids, or complexes formed by proteins and partly to completely deglycosylated glycoalkaloids, thereby achieving a more effective and complete removal of glycoalkaloids from the solution.

The invention accordingly relates to a process for removing glycoalkaloids and/or alkaloids from PFJ, potato fruit water or an aqueous solution of a vegetable protein comprising contacting the solution to a layered silicate for a period effective to adsorb the glycoalkaloids, and separating the layered silicate from the solution to obtain a substantially glycoalkaloid-free aqueous solution of vegetable protein.

FIG. 1 of the drawings is a chart showing total glycoalkaloid in potato fruit juice versus addition of bentonite.

Figure 2:
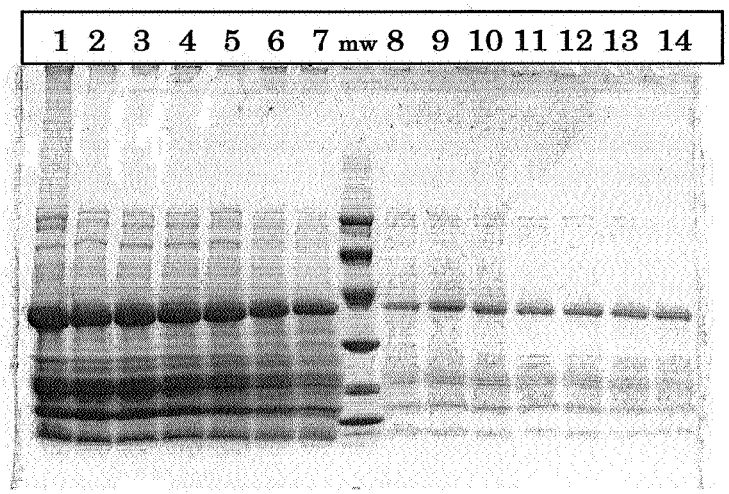

FIG. 2 of the drawings shows analysis of the protein of potato fruit juice using electrophoresis.

Figure 3:
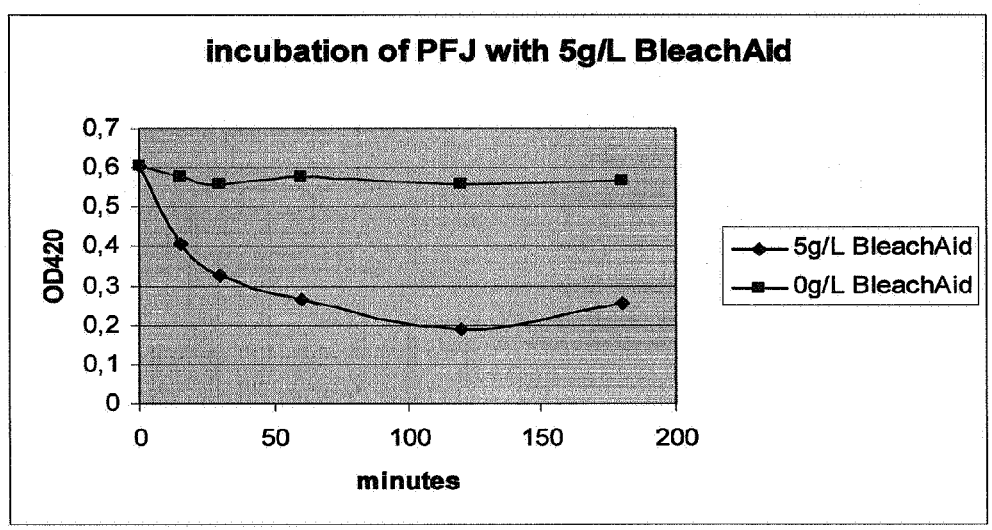

FIG. 3 of the drawings is a graphical representation of the incubation of potato fruit juice with bentonite.

Figure 4:
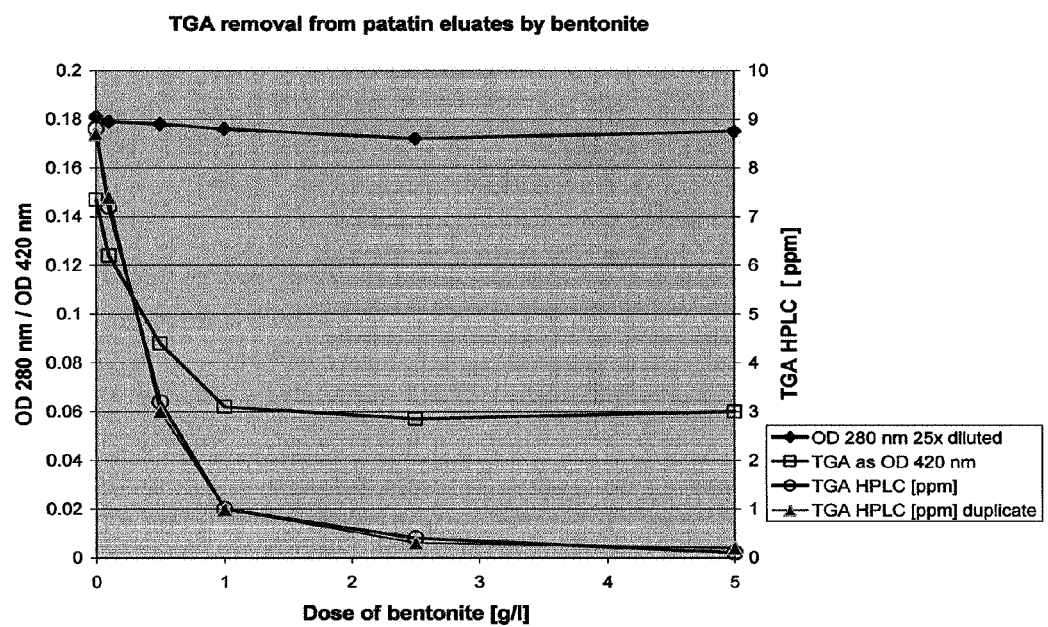

FIG. 4 of the drawings charts total glycoalkaloid removal from patatin eluates by bentonite.

Figure 5:
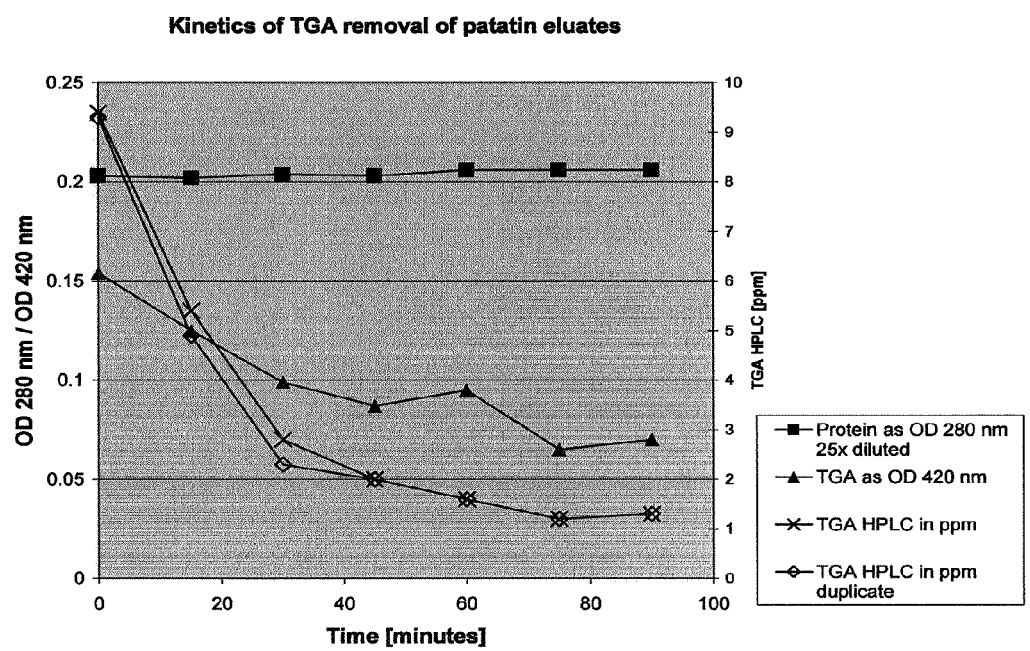

FIG. 5 of the drawings charts the kinetics of total glycoalkaloid removal of patatin eluates.

A process according to the invention is highly economical and effective even in a large scale production of the vegetable protein. Using a process according to the invention, it has been found possible to achieve glycoalkaloid levels as low as <10 ppm (based on dry matter), thereby yielding a vegetable protein suitable for any food or pharmaceutical application. The glycoalkaloid level herein refers to the total of glycosylated and deglycosylated glycoalkaloids. It has further been found that a process according to the invention essentially does not suffer from undesired loss of protein. Other advantages of the invention will become clear from the present disclosure.

DETAILED DESCRIPTION OF THE INVENTION

It will be understood that the aqueous solution of a vegetable protein subjected to glycoalkaloid removal according to the invention will be a solution comprising undesired amounts of glycoalkaloids. Typical amounts of glycoalkaloids in the solution lie between 1 and 300 ppm, preferably between 3 and 50 ppm. The typical amount of glycoalkaloids in PFJ is in the range of 50-200 ppm on liquid basis, while the typical amount of glycoalkaloids in protein isolates lies within the range of 1-40 ppm on liquid basis.

In a preferred embodiment, a process according to the invention is part of a process for isolating or recovering a vegetable protein from its vegetable source. In the context of the invention, the vegetable protein may be from any vegetable source containing glycoalkaloids or alkaloids. Preferred examples include potato, yam, sweet potato, taro, oca and cassava. Typical concentrations of the vegetable protein in the aqueous solution from which glycoalkaloids are to be removed according to the invention are from 0.1 to 300 preferably from 0.5 to 50 ppm on liquid basis. It is to be noted that the invention is specifically directed to removal of glycoalkaloids from a solution of a vegetable protein. This means that the protein is in its soluble form preferably in its native, non-denatured form.

Other substances besides the vegetable protein and the glycoalkaloids may also be present in an aqueous solution to be subjected to a process according to the invention, as long as they do not, or at least not substantially, affect the native, non-denatured state of the vegetable protein. They will not, or not to any significant degree, affect the effectiveness of a process according to the invention for removing glycoalkaloids. If the removal of glycoalkaloids is part of the isolation of a vegetable protein, the nature and amount of these substances will depend on the stage in the isolation of the vegetable protein at which the removal is carried out. Typical examples of possibly present substances are fatty materials, fibres and pectines. The presence of organic solvents in which glycoalkaloids are readily soluble, such as methanol and ethanol, is not preferred.

The layered silicate that is used in a process according to the invention may be of a natural or synthetic nature. Preferably, it has a large contact surface. Very suitable are layered silicates are layered phyllosilicates composed of magnesium and/or aluminum silicate layers which are each about 7-12 Å in thickness. Especially preferred are smectite-like clay minerals, such as montmorillonite, bentonite, saponite, hectorite, fluorohectorite, beidellite, nontronite, vermiculite, wilkinite, halloysite and stevensite. Also fibrous clays, such as sepiolite, attapulgite, palygorskite can be used. In a highly preferred embodiment, the layered silicate is a calcium bentonite, bleaching earth, or fuller's earth. It is further preferred that these layered silicates are used in activated form, which means that they have been treated with acid before use. The activation of layered silicates can be carried out according to well-know procedures. Examples of commercially available preferred layered silicates to be used according to the invention are BleachAid™, Tonsil® a trademark of Sud-Chemie, Tonsil® supreme 112FF, Tonsil® Optimum 210FF, Standard 310FF, Standard 3141FF, Microsorb® 25/50 LSC-7, Engelhard Grade F-52, Engelhard Grade F-24, gumbrin, AccoF-loc® 352, AccuGel™ F, Akajo, Altonit SF, Ankerpoort col-clay A90, Aquagel®, Aquagel Gold SEAL®, asama, askangel, baroco, ben-gel 11, yellow stone, western bond, natural gel, hydrocol HSUF, kunigel V2, mineral colloid 101, mineral colloid 103, polargel, Bentonite magma, tixoton, and Volclay® bentonite BC.

In one embodiment of the invention, the layered silicate is simply added to the aqueous solution of the vegetable protein and, after a period effective for the layered silicate to adsorb the glycoalkaloids, removed. Typically, a residence time of between 10 and 90 minutes, preferably between 30 and 60 minutes is sufficient to effect near complete removal of the glycoalkaloids present. Advantageous in this embodiment, is that the layered silicate with the glycoalkaloids adsorbed thereto will precipitate, thereby facilitating an easy removal by filtration. In batch wise operation gentle stirring is needed to suspend the particles and to maximize adsorption. Adsorption is carried out at ambient temperature in the range of 10-35° C. A suitable particle size distribution is at least 90 wt. % between 32 and 250 micrometer as determined using a sieve analysis on a Retsch AS200.

In another embodiment of the invention, the layered silicate is used as a column material over which the aqueous solution of the vegetable protein is passed as an eluent. During elution, the glycoalkaloids will adsorb to the layered silicate and at the bottom of the column, the collected eluate is an aqueous solution of the vegetable protein from which glycoalkaloids are essentially completely removed. In accordance with this embodiment, it is preferred that a rather coarse layered silicate is used. Preferably, in this embodiment at least 80 wt. % of the layered silicates have a particle size of between 500 and 2000 micrometer, as measured using a sieve analysis on a Retsch AS200.

The height of the column in which the layered silicate is packed in accordance with this embodiment is preferably between 60 and 100 cm. The bed dimensions can be in height to width ratio of 2:1 to 5:1 or higher. Typically, a residence time of between 10 and 120 minutes, preferably between 30 and 60 minutes is sufficient to effect near complete removal of the glycoalkaloids present. Use of the layered silicate in the form of a column over which the aqueous solution of the vegetable protein is eluted allows for a very efficient and economical process, which can even be performed in a continuous manner. It will be understood, however, that after some time the column material will become saturated with glycoalkaloids and will have to be replaced with fresh material. It is preferred that the saturation level of the layered silicate with glycoalkaloids is monitored during performance of a process according to the invention.

The optimum pH for carrying out a process according to the invention depends on the pH of the aqueous solution of the vegetable protein in relation to the physical properties, and in particular the solubility, of the protein and protein fractions involved. In the case of protease inhibitor isolates, a low pH such as in the range of 3.0-4.5 can be used, whereas total protein isolates or patatin isolates place more constraints on the pH range that can be used. A pH of at least 4.0, such as at least 5.0, or at least 6.5, preferably between 7.0 and 8.5, is preferred for removing essentially all glycoalkaloids without significant loss of protein due to precipitation or adsorption to the layered silicate.

As mentioned above, it is preferred that a process according to the invention is carried out as part of a process for isolating a protein or protein fraction from a vegetable source. In accordance with this embodiment, a process according to the invention may be carried out on the vegetable fruit juice, preferably potato fruit juice, as the aqueous solution of the vegetable protein. It has been found that the use of a layered silicate in potato fruit juice will lower the glycoalkaloid level from 30-200 ppm to 0.5-1 ppm. This will lead to a process stream that can be used for both heat coagulated protein processes as mild separation processes.

In a highly preferred embodiment, a process according to the invention is carried out as part of a process for isolating a protein or protein fraction as disclosed in the European patent application no. 06077000.5. This process comprises the steps of subjecting potato fruit juice to a flocculation by a divalent metal cation at a pH of 7-9;

centrifuging the flocculated potato fruit juice, thereby forming a supernatant;

subjecting the supernatant to expanded bed adsorption chromatography operated at a pH of less than 11, and a temperature of 5-35° C. using an adsorbent capable of binding potato protein, thereby adsorbing the native potato protein to the adsorbent; and eluting at least one native potato protein isolate from the adsorbent with an eluent, and leads to a highly pure native potato protein isolate with a minimum of denatured protein and stable solubility. It is preferred that the layered silicate is used to remove glycoalkaloids after the step of expanded bed adsorption chromatography.

According to this embodiment, the potato fruit juice is pre-treated with a divalent metal cation at a pH of 7-9, preferably 7.0-7.5, to flocculate undesired material, followed by a separation of the flocks by centrifugation. A particularly suitable divalent metal cation is $Ca^{2+}$. It has been found that this pre-treatment removes undesired material such as negatively charged polymers, pectins, to some extent glycoalkaloids, and micro-organisms from the potato fruit juice. In particular, the removal of pectins and glycoalkaloids is advantageous, since these compounds adhere to the potato proteins and may cause flocculation. These compounds thus lead to an unstable protein isolate.

In the second step of the process, the supernatant is subjected to expanded bed adsorption chromatography. This technique is described in WO-A-2004/082397, which document is hereby incorporated by reference. In contrast to the method described in WO-A-2004/082397, according to process of the invention it is advantageous to keep the temperature of the starting material below 35° C. for a better stability of patatin. Furthermore, in the process of the invention it is preferred to use a moderately high flow rate, typically in the range of 600-1200 cm/h.

The expanded bed adsorption chromatography is operated at a pH of less than 11, preferably at a pH of less than 10.

The native potato proteins in the pre-treated potato fruit juice are isolated from the supernatant by binding them onto a suitable adsorbent in the expanded bed adsorption column.

Column materials that bind native potato proteins include mixed-mode adsorbentia such as Amersham Streamline™ Direct CST I (GE Healthcare), Fastline™ adsorbentia (Upfront Chromatography A/S), macroporous adsorbentia such as Amberlite™ XAD7HP (Röhm & Haas Company) and ion exchange adsorbents (for patatin isolates and purification see G. Koningsveld, "*Physico-chemical and functional properties of potato proteins*", PhD thesis, Wageningen University, Wageningen, The Netherlands, 2001; for protease inhibitor isolates see L. Pouvreau, "*Occurrence and physico-chemical properties of protease inhibitors from potato tuber (Solanum tuberosum)*", PhD thesis, Wageningen University, Wageningen, The Netherlands, 2004). The adsorbent with adsorbed native potato proteins is subsequently eluted with a suitable eluent in order to retrieve the native potato protein isolate. The eluent preferably has a pH in the range of 4-12, more preferably in the range of 5.5-9.0.

Preferably, the native potato protein isolate has an isoelectric point above 4.8, a molecular weight of more than 5 kDa and a glycoalkaloid concentration of less than 150 ppm on protein basis.

In a preferred embodiment using mixed-mode adsorbentia the proteins can be fractionated to both isoelectric point and molecular weight. This allows separating the patatin and protease inhibitor fractions. Patatin isolates are eluted at a pH of 5.7-8.7, preferably at a pH of 5.8-6.2. Protease inhibitors are eluted at a pH of 5.8-12.0, preferably at a pH of 6.0-9.5.

The mixed-mode adsorbentia can be used in two modes. The first mode is selective elution, which comes down to binding of essentially all of the potato protein and subsequently eluting a first desired potato protein fraction with an appropriate buffer and eluting a second desired potato protein fraction with another appropriate buffer. The second mode is selective adsorption, which comes down to binding of a first desired potato protein fraction on one column at an elevated pH, and adjusting the effluent to a lower pH so that a second desired potato protein fraction can bind on a second column.

Selective elution is described in the examples. Selective adsorption for instance involves passing a potato fruit juice at pH 5.0-7.0, typically at pH 6.0, over a first column to bind the protease inhibitor fraction. The protease inhibitor fraction may be eluted using an appropriate buffer as described above. The effluent of the first column is adjusted to a pH of 4.5-5.0, preferably to a pH of 4.8, and passed over a second column to bind the patatin fraction. Patatin is eluted using an appropriate buffer as described above. Selective adsorption yields a robust processing and higher purity of the isolates than selective elution.

After elution, the native potato proteins may advantageously be concentrated by ultrafiltration. The choice of the ultrafiltration membrane material can strongly influence the selectivity. Preferably, the ultrafiltration membrane is negatively charged and comprises regenerated cellulose, polyethersulphones and polysulphones (PES). Protease inhibitors isolates may be concentrated using PES based membranes with a molecular cut-off of 2-20 kDa, and to some extent 30 kDa. Patatin isolates may be concentrated using PES based membranes with a molecular cut-off of 5-30 kDa or a regenerated cellulose based membrane with a molecular cut-off of 5-30 kDa. These membranes can be implemented as tubular, spiral wound, hollow fibre, plate and frame, or as cross-rotational induced shear filter units.

Ultrafiltration membranes should be operated at conditions that lead to concentration effectively. Patatin isolates are ultrafiltrated at pH values of 4.0-6.0, preferably pH 4.5-5.4. For protease inhibitor isolates pH values of 3-7, preferably 3.2-4.5 are used. After removal of glycoalkaloids the pH can be increased to pH 7-10 to enable high fluxes through the membranes. Protease inhibitors are preferably processed at low pH of 3.0-5.0.

The native potato protein isolate thus obtained is essentially free from toxic components and colour. The isolate is further organoleptically neutral and stable. Additional purification steps in the process of the invention can be the following. An ion-exchange step may be applied to isolate protease inhibitors or patatin with an alkaline or acid elution.

The removal of glycoalkaloids in accordance with the invention is preferably included in a process as disclosed in the European patent application no. 06077000.5 after the expanded bed adsorption chromatography and after ultrafiltration, if included. This means that it is preferred that after the elution of the expanded bed, a second elution over a column of a layered silicate, essentially as described above is performed.

The invention also encompasses a native potato protein isolate obtainable by a process according to this embodiment, and having a glycoalkaloid content below 100 ppm, preferably below 10 ppm.

The invention will now be further elucidated by the following, non-restrictive examples.

EXAMPLES

Protein Determination

The protein concentration was estimated by measuring the adsorption at 280 nm of an adequate dilution of a sample in a 0.1 M NaOH solution. This absorption at 280 nm corresponds with protein as determined by nitrogen level×6.25 by the equations. The baseline is adjusted to zero with 100 mM NaOH. For patatin the equation is patatin=(OD 280 nm×dilution factor+0.0007)/1.10 [mg/g]); for protease inhibitor isolates the equation is protease inhibitor=(OD 280 nm×dilution factor+0.0301)/1.02 [mg/g].

Total Glycoalkaloid Determination

Glycoalkaoids were determined using both a HPLC method (Houben et al., J. Chromatogr. A, 1994, 661, 169-174) and a colorimetric method (Walls et al., J. Chem. Ecol. 2005, 31, 2263-2288). The first analysis determines the main glycoalkaloids, the second analysis is a quick assay that determines both total glycoalkaloids and the aglycons after acid hydrolysis. In the colorimetric analysis all the glycoalkaloids are de-glycosylated by acid treatments into solanidine. The resulting material is extracted with chloroform and the reaction product with methyl orange is measured at 420 nm. The levels of both α-solanine and α-chaconine was determined using the HPLC method. The detection level was >0.15-0.3 ppm.

Example 1

Fresh potato fruit juice from the potato variety Seresta was obtained from a potato starch factory at Ter Apelkanaal, The Netherlands. The potato fruit juice was obtained after the removal of starch and fibres. Various amounts of BleachAid™ (bentonite) (Engelhard) were added to 100 ml of potato fruit juice (0, 1, 5, 10, 50 and 100 g/l).

The liquids were shaken slowly at 180 rpm in a 250 ml shake flask for 4 hours at room temperature. After 4 hours the BleachAid™ was sedimented and decanted. The supernatant was analysed for protein and total glycoalkaloid levels. The protein was determined by measuring the optical density at 280 nm in 100 mM NaOH using an appropriate dilution. Total glycoalkaloid (TGA) levels were determined using a colorimetric assay and measuring the optical density of the alkaloid complex at 420 nm. Untreated potato fruit juice was used as reference. The results are summarized in Table 1 and FIG. 1.

TABLE 1

Effect of BleachAid ™ in TGA removal

| Added | initial pH | pH after 4 hours | Protein OD 280 nm 100x diluted | TGA OD 420 nm average |
|---|---|---|---|---|
| PFJ* | 5.80 | n.a. | 0.603 | 0.725 |
| 0 g/l | 5.77 | 5.51 | 0.414 | 0.665 |
| 1 g/l | 5.76 | 5.47 | 0.403 | 0.476 |
| 5 g/l | 5.73 | 5.44 | 0.382 | 0.267 |
| 10 g/l | 5.69 | 5.40 | 0.361 | 0.193 |
| 50 g/l | 5.46 | 5.22 | 0.298 | 0.170 |
| 100 g/l | 5.26 | 5.01 | 0.281 | 0.164 | n.a.: not applicable.
*PFJ not treated in a shake flasks, not sedimented.

The TGA analysis shows a value of 0.20 or lower at high dosing. This corresponds to the effects of other small compounds in the potato fruit juice that form similar complexes in the calorimetric assay.

Potato fruit juice contains many compounds that adsorb at an optical density of 280 nm. Analysis of the protein using electrophoresis, SDS PAGE, ware carried out to analyse the effects of bentonite dosing on protein composition and protein. The results are shown in FIG. 2.

Incubation of potato fruit juice with BleachAid™ (bentonite) resulted in an affective removal of glycoalkaloids. Dosing of 10-100 g/l to potato fruit juice gave a near complete removal of glycoalkaloids. Additional glycoalkaloid analysis using the HPLC method showed a glycoalkaloid level of α-solanine and α-chaconine of less than 0.3 ppm. The initial levels of TGA in the potato fruit juice were 66 ppm.

The background of the analysis was significant by interference of low molecular compounds and partly the protease inhibitors that are co-extracted in the colorimetric method. The HPLC analysis gave reliable analysis of the residual glycoalkaloid levels.

Dosing of 1-10 g/l of BleachAid™ did not lead to a significant loss (<2%) of protein. The observed reduction of OD 280 nm of 2.7, 7.7 and 12.8% respectively was not found in the protein analysis by electrophoresis. Dosing of high levels of BleachAid™ resulted in significant, but acceptable acidification.

The kinetics of TGA adsorption were determined by adding 5 g/l BleachAid™ to 100 ml potato fruit juice gently shaken at room temperature. The results are shown in Table 2 and FIG. 3.

TABLE 2

Kinetics glycoalkaloid removal from potato fruit juice

| Incubation time Min | pH no BleachAid ™ | pH Added 5 g/l BleachAid ™ | TGA as OD 420 nm no BleachAid ™ | TGA as OD 420 nm 5 g/l BleachAid ™ Average |
|---|---|---|---|---|
| 0 | 5.86 | n.a. | 0.604 | 0.604 |
| 15 | 5.92 | 5.90 | 0.578 | 0.407 |
| 30 | 5.92 | 5.89 | 0.560 | 0.320 |
| 60 | 5.90 | 5.87 | 0.578 | 0.263 |
| 120 | 5.88 | 5.87 | 0.556 | 0.192 |
| 180 | 5.84 | 5.84 | 0.567 | 0.253 |

Within 60 minutes the TGA levels were below the detection limit of the colorimetric assay. HPLC analysis showed that the initial TGA level of the residual level of TGA was below 0.3 ppm.

Example 2

Eluates containing protease inhibitors derived from the adsorption process as described in Example 1 method 10 of European patent application no. 06077000.5 were used as starting material. Solutions with initial pH values of 3.45 and 11.27 were used to start a pH range. The pH dependence of binding to BleachAid™ was tested. 10 ml protease inhibitors eluate with set pH were incubated during 2 hours with 0, 1 and 5 g/l BleachAid™ in a shake flask. The BleachAid™ was removed by sedimentation. The TGA and protein levels were determined as presented in table 3.

TABLE 3

Effect of pH on adsorption of TGA to BleachAid ™

| Initial pH | BleachAid ™ added (g/l) | Final pH | Protein as OD 280 nm (25x diluted) | TGA as OD 420 nm Average** | TGA delta OD 420 nm | TGA reduction as % in OD 420 nm |
|---|---|---|---|---|---|---|
| 3.45 | 0 | 3.45 | 0.438 | 0.262 | 0 | |
|  | 1 | 3.45 | 0.438 | 0.235 | 0.028 | 10.4 |
|  | 5 | 3.44 | 0.424 | 0.163 | 0.010 | 37.9 |
| 4.45 | 0 | 4.47 | 0.420 | 0.247 | 0 | |
|  | 1 | 4.45 | 0.417 | 0.200 | 0.047 | 18.8 |
|  | 5 | 4.44 | 0.412 | 0.160 | 0.087 | 35.2 |
| 5.45 | 0 | 5.44 | 0.402 | 0.210 | 0 | |
|  | 1 | 5.43 | 0.398 | 0.160 | 0.051 | 24.0 |
|  | 5 | 5.42 | 0.390 | 0.129 | 0.081 | 38.4 |
| 6.43 | 0 | 6.39 | 0.399 | 0.208 | 0 | |
|  | 1 | 6.40 | 0.398 | 0.152 | 0.056 | 26.8 |
|  | 5 | 6.36 | 0.390 | 0.086 | 0.122 | 58.5 |
| 8.50 | 0 | 8.36 | 0.396 | 0.184 | 0 | |
|  | 1 | 8.11 | 0.392 | 0.155 | 0.029 | 15.7 |
|  | 5 | 7.52 | 0.388 | 0.105 | 0.079 | 42.9 |
| 9.53 | 0 | 9.26 | 0.459 | 0.175 | | |
|  | 1 | 9.10 | 0.460 | 0.263 | | |
|  | 5 | 8.51 | 0.455 | 0.187 | | |
| 11.27 | 0 | 10.88 | 0.464 | 0.235 | 0 | |
|  | 1 | 10.51 | 0.458 | 0.179 | 0.056 | 23.8 |
|  | 5 | 9.98 | 0.477 | 0.162 | 0.073 | 31.0 |

**Lowest value for this assay is 0.08 by interference; corresponding to ≦0.3 ppm in the HPLC analysis The small decrease in OD 280 nm and OD 420 nm at increasing pH in samples with 0 g/l added BleachAid™ were caused by dilution at setting the pH with 4 M NaOH. The background signal of the calorimetric assay was increased when measuring the protease inhibitor eluates. The colorimetric assay gave a background of 0.06-0.08 units at 420 nm. HPLC analysis showed a TGA level in those samples of less than 0.3 ppm. TGA removal showed an optimum at pH 6.43 with levels below 0.3 ppm. pH values below 4 and above 9.5 resulted in a precipitation and loss of proteins. BleachAid™ could be separated from the sedimented protein as it sediments much faster than the protein flocks.

Example 3

Eluates with patatin derived from the adsorption process as described in Example 1 method 9 of European patent application no. 06077000.5 were set at pH 4.5; 5.5; 6.5 and 7.5. 10 ml sample was incubated with 5 g/l of the selected bentonite in a 15 ml falcon tube during 90 minutes while gently shaking at room temperature. All samples were centrifuged at 500 rpm (44×g) for 2 minutes as some bentonites did not sediment well. Two blanks without betonites were incubated in the same way. The TGA and protein levels were determined as presented in Table 4.

TABLE 4

Removal of TGA using various bentonites at various pH

|  | pH | pH after 90 min | Protein as OD 280 nm 25x diluted | TGA as OD 420 nm Average |
|---|---|---|---|---|
| blank1 | 4.5 | 4.52 | 0.148 | 0.157 |
|  | 5.5 | 5.60 | 0.177 | 0.179 |
|  | 6.5 | 6.64 | 0.168 | 0.167 |
|  | 7.5 | 7.41 | 0.167 | 0.148 |
| Tonsil ® supreme 112FF | 4.5 | 4.37 | 0.103 | 0.064 |
|  | 5.5 | 5.44 | 0.117 | 0.053 |
|  | 6.5 | 6.46 | 0.146 | 0.048 |
|  | 7.5 | 6.97 | 0.155 | 0.065 |
| blank2 | 4.5 | 4.51 | 0.144 | |
|  | 5.5 | 5.59 | 0.166 | 0.107 |
|  | 6.5 | 6.61 | 0.172 | 0.100 |
|  | 7.5 | 7.42 | 0.185 | 0.030 |
| Tonsil ® Optimum 210FF | 4.5 | 4.44 | 0.162 | 0.020 |
|  | 5.5 | 5.52 | 0.174 | 0.027 |
|  | 6.5 | 6.52 | 0.184 | 0.007 |
|  | 7.5 | 7.06 | 0.172 | 0.104 |
| Tonsil ® Standard 310FF | 4.5 | 4.50 | 0.143 | 0.000 |
|  | 5.5 | 5.55 | 0.172 | 0.007 |
|  | 6.5 | 6.64 | 0.195 | 0.002 |
|  | 7.5 | 7.21 | 0.198 | 0.006 |
| Tonsil ® Standard 3141FF | 4.5 | 4.35 | 0.140 | −0.001 |
|  | 5.5 | 5.39 | 0.155 | 0.008 |
|  | 6.5 | 6.45 | 0.163 | −0.003 |
|  | 7.5 | 6.98 | 0.170 | 0.006 |
| Engelhard BleachAid ™ | 4.5 | 4.37 | 0.125 | 0.007 |
|  | 5.5 | 5.43 | 0.146 | −0.005 |
|  | 6.5 | 6.47 | 0.152 | −0.003 |
|  | 7.5 | 7.02 | 0.160 | 0.001 |
| Not treated | 4.5 | n.a. | 0.165 | 0.103 |
|  | 5.5 | n.a. | 0.174 | 0.092 |
|  | 6.5 | n.a. | 0.171 | 0.097 |
|  | 7.5 | n.a. | 0.171 | 0.082 |

All bentonites tested could be used to remove the TGA in patatin solutions to levels below the detection limit of the calorimetric analysis method. The HPLC method showed TGA levels below 0.3 ppm. The use of pH values with or without bentonite below or equal to pH 5.5 resulted in protein precipitation that was removed by centrifugation together with the bentonite.

Dose effects of BleachAid™ on TGA removal in patatin eluates were evaluated as follows. 40 ml Patatin eluates were incubated with BleachAid™ of Engelhard/BASF at pH 7.0. After 90 minutes the bentonite was separated by centrifugation for 5 minutes at 500 rpm (44×g). The results are shown in Table 5 and FIG. 4.

TABLE 5

Dose effects on TGA removal

| BleachAid™ g/l | pH | OD 280 nm 25× diluted | TGA as OD 420 nm average | TGA HPLC ppm Solanine | ppm average |
|---|---|---|---|---|---|
| starting material | 7.04 | 0.197 | 0.141 | 9.3  8.7 | 9.0 |
| 0 | 7.04 | 0.181 | 0.147 | 8.8  8.7 | 8.75 |
| 0.1 | 7.02 | 0.179 | 0.124 | 7.2  7.4 | 7.3 |
| 0.5 | 7.01 | 0.178 | 0.088 | 3.2  3.0 | 3.1 |
| 1 | 6.99 | 0.176 | 0.062 | 1.0  1.0 | 1.0 |
| 2.5 | 6.91 | 0.172 | 0.057 | 0.4  0.3 | 0.35 |
| 5 | 6.82 | 0.175 | 0.060 | 0.1  0.2 | 0.15 |

TGA was effectively removed by incubation with BleachAid™. Both calorimetric and HPLC TGA analysis showed the effective TGA removal with dosages above 1 g/l bentonite. No significant protein loss was found, expressed as OD 280 nm, under these conditions. In packed columns using BleachAid™, in particular the course grade F-24 bentonite of Engelhard with dosing of much more than 600 g/l, led to TGA levels in the treated patatin eluates below 0.3 ppm.

The kinetics of TGA removal in patatin eluates were evaluated as follows. 40 ml Patatin eluate was incubated with 1 g/l BleachAid™ for 0, 15, 30, 45 and 60 minutes. After 90 minutes the bentonites were separated by centrifugation for 5 minutes at 500 rpm (44×g). The results are shown in Table 6 and FIG. 5.

TABLE 6

Kinetics of TGA removal of patatin eluates

| Time Min | Protein as OD 280 nm 25× diluted Average | TGA as OD 420 nm Average | TGA HPLC solanine in ppm | TGA HPLC solanine in ppm Average |
|---|---|---|---|---|
| 0 | 0.203 | 0.154 | 9.4  9.3 | 9.35 |
| 15 | 0.202 | 0.125 | 5.4  4.9 | 5.15 |
| 30 | 0.204 | 0.099 | 2.8  2.3 | 2.55 |
| 45 | 0.203 | 0.087 | 2.0  2.0 | 2.0 |
| 60 | 0.206 | 0.095 | 1.6  1.6 | 1.6 |
| 75 | 0.206 | 0.065 | 1.2  1.2 | 1.2 |
| 90 | 0.206 | 0.070 | 1.3  1.3 | 1.3 |

It was found that 1 g/l BleachAid™ can bind TGA effectively from a patatin eluate to levels of 1.2-1.3 ppm. After ultrafiltration and spray-drying of this diluted eluate, the dried product contained less than 100 ppm TGA. Similarly concentrates of protease inhibitors with a 4-20% protein on dry matter yielded a residual TGA level of 1-2 ppm. This yielded a dried product with TGA levels of less than 10-80 ppm.

Example 4

XK 50/30 chromatography column (Amersham Biosciences), Peristaltic pump (Masterflex), patatin eluate derived from the adsorption process as described in Example 1 method 9 of European patent application no. 06077000.5, Grade F-24 bentonite.

Approximately 500 ml of Engelhard Grade F-24 bentonite granules were prewashed with water and allowed to sediment. The finest material was removed to prevent the column from clogging. The bentonite material obtained in this way was transferred quantitatively to the Amersham column and washed with 2 column volumes of demineralised water running in upflow orientation. 2 l of Patatin eluate of pH 7.6 were run over the column at a speed of 7 ml/minute (residence time of 60 minutes). Fractions were collected at one hour time intervals and analysed for protein- and glycoalkaloid levels. The results are summarized in Table 7.

TABLE 7 glycoalkaloid removal in a column

| Sample number | Comment | Time (h) | OD 280 nm (25× diluted) | PPM TGA | Duplicate |
|---|---|---|---|---|---|
| 1 | Starting values | 0 | 0.13 | 10.6 | 10.4 |
| 2 | | 1 | 0.05 | — | — |
| 3 | | 2 | 0.09 | — | — |
| 4 | | 3 | 0.09 | 0 | 0 |
| 5 | | 4 | 0.10 | 0 | 0 |
| 6 | | 5 | 0.10 | 0 | 0 |

Grade F-24 bentonite can quantitatively remove glycoalkaloids in a packed column with a residence time of 60 minutes. The OD 280 nm signal is slightly lower after the column due to some initial protein loss and removal of colouring components.

Example 5

Eluates with patatin were derived from the adsorption process as described in Example 1 method 9 of European patent application no. 06077000.5. Eluates containing protease inhibitors were derived from the adsorption process as described in Example 1 method 10 of European patent application no. 06077000.5. Subsequently the samples were concentrated by ultrafiltration with polyether sulphonate membrane with a molecular cut off of 10 kDa. Seresta is a high glycoalkaloid potato variety with levels of 200 ppm in fresh weight potato. Aveka is a low glycoalkaloid potato variety with levels of 30 ppm in fresh weight potato. The results are summarized in Table 8.

TABLE 8 glycoalkaloid removal using ultrafiltration

| Protein solution | Protein concentration initial [g/l] | TGA initial [ppm] | TGA Initial [ppm on protein basis] | Protein concentration after ultrafiltration [g/l] | TGA Final concentration [ppm] | TGA level [ppm on protein basis]** |
|---|---|---|---|---|---|---|
| Patatin eluate ex Seresta | 6 | 16 | 2695 | 93 | 39 | 425 |
| Above concentrate diafiltrated 5 times | | | | 92 | 33 | 298 |
| Patatin eluate ex Seresta | 4.4 | 11 | 3090 | 28.6 | 40 | 1103 |
| Patatin eluate ex Seresta | 3.5 | 14 | 3181 | 38.7 | 32 | 1044 |
| Protease inhibitor eluate ex Seresta | 11.8 | 20 | 1695 | 105.7 | 55 | 520 |
| Patatin eluate ex Aveka | 8 | 2.7 | 333 | 110 | 11 | 98 |
| Protease inhibitor eluate ex Aveka | 14 | 5.7 | 410 | 140 | 21 | 144 |

**analysed in final dried product.

Example 6

Particle size distributions were determined on a sieve Retsch AS200 control "g" operating at 200 mm amplitude with interval times of 10 seconds over a period of 5 minutes using appropriate sized sieves. The results are shown in Tables 9 and 10.

TABLE 9

Particle size distributions
Particle size distributions in % for granular bentonite Grade F-24

| Fraction (micrometer) | % |
|---|---|
| >2 000 | 7.1 |
| 2 000-1 000 | 64.5 |
| 800-1 000 | 9.0 |
| 500-800 | 11.5 |
| <500 | 7.9 |

TABLE 10

Particle size distributions
Particle size distribution in % for bentonite powder BleachAid ™

| Fraction (micrometer) | % |
|---|---|
| >500 | 0 |
| 300-500 | 0.3 |
| 250-300 | 1.7 |
| 150-250 | 21 |
| 90-150 | 27.5 |
| 60-90 | 18.5 |
| 32-60 | 25.4 |
| <32 | 5.6 |

The invention claimed is:

1. A process for removing glycoalkaloids from an aqueous solution of a native non-denatured vegetable protein comprising contacting the aqueous solution with a layered silicate for a period of time effective to adsorb the glycoalkaloids, and separating the glycoalkaloid bearing layered silicate from the solution to obtain a substantially glycoalkaloid-free aqueous solution of native non-denatured vegetable protein such that there is no undesired loss of protein from said aqueous solution.

2. A process according to claim 1, wherein the vegetable protein is a potato protein, a yam protein, a sweet potato protein, a taro protein, an oca protein, or a cassava protein.

3. A process according to claim 1, wherein the aqueous solution, before contacting the layered silicate, comprises between 1 and 400 ppm of glycoalkaloids.

4. A process according to claim 1 carried out as part of a process for isolating or recovering a protein or protein fraction from a vegetable source.

5. A process according to claim 1, wherein the layered silicate is a smectite-like clay mineral, such as montmorillonite, bentonite, saponite, hectorite, fluorohectorite, beidellite, nontronite, vermiculite, wilkinite, halloysite or stevensite.

6. A process according to claim 5, wherein the layered silicate is a calcium bentonite, bleaching earth, or fuller's earth.

7. A process according to claim 6, wherein the layered silicate is an activated calcium bentonite, activated bleaching earth, or activated fuller's earth.

8. A process according to claim 1, wherein the aqueous solution of the vegetable protein is contacted with the layered silicate at a pH in the range of 3.0-4.5.

9. A process according to claim 1, wherein the aqueous solution of the vegetable protein is contacted with the layered silicate at a pH of at least 4.0.

10. A process according to claim 1, wherein the layered silicate is added to the aqueous solution of the vegetable protein and, after a period effective for the layered silicate to adsorb the glycoalkaloids, removed.

11. A process according to claim 10, wherein the layered silicate is removed by filtration.

12. A process according to claim 1, wherein said contacting the solution with the layered silicate step comprises using said layered silicate as a column material over which the aqueous solution of the vegetable protein is passed as an eluent.

13. A process according to claim 12, wherein the layered silicate has an average particle size of between 0.50 and 2.00 mm as determined using a sieve analysis on a Retsch AS200.

14. A process according to claim 1, wherein the aqueous solution of the vegetable protein is contacted with the layered silicate at a pH of at least 5.0.

15. A process according to claim 1, wherein the aqueous solution of the vegetable protein is contacted with the layered silicate at a pH of at least 6.5.

16. A process according to claim 1, wherein the aqueous solution of the vegetable protein is contacted with the layered silicate at a pH of between 7.0 and 8.5.

17. A process according to claim 10, wherein the layered silicate is removed by sedimentation.

* * * * *

UNITED STATES PATENT AND TRADEMARK OFFICE
CERTIFICATE OF CORRECTION

PATENT NO.       : 8,486,481 B2
APPLICATION NO.  : 12/514249
DATED            : July 16, 2013
INVENTOR(S)      : Giuseppin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this
Eighth Day of September, 2015

Michelle K. Lee
*Director of the United States Patent and Trademark Office*